(12) United States Patent
Genrich

(10) Patent No.: US 6,640,237 B1
(45) Date of Patent: Oct. 28, 2003

(54) METHOD AND SYSTEM FOR GENERATING A TRIGONOMETRIC FUNCTION

(75) Inventor: Thad J. Genrich, Aurora, CO (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/361,917

(22) Filed: Jul. 27, 1999

(51) Int. Cl.$^7$ .............................. G06F 1/02; G06F 7/38

(52) U.S. Cl. ...................................... 708/276; 708/440

(58) Field of Search ................................ 708/276, 440

(56) References Cited

U.S. PATENT DOCUMENTS

| | | | | |
|---|---|---|---|---|
| 3,969,615 A | | 7/1976 | Bowers et al. | 235/151.11 |
| 4,077,063 A | * | 2/1978 | Lind | 708/440 |
| 4,486,846 A | | 12/1984 | McCallister et al. | 364/607 |
| 4,787,058 A | | 11/1988 | Schmars | 364/807 |
| 4,809,205 A | * | 2/1989 | Freeman | 708/440 |

(List continued on next page.)

FOREIGN PATENT DOCUMENTS

| | | | |
|---|---|---|---|
| DE | 196 16 368 C1 | 12/1997 | H03D/3/02 |
| EP | 0 102 784 A2 | 3/1984 | G06F/1/02 |
| EP | 0 392 229 A3 | 10/1990 | H04L/25/06 |
| EP | 0 889 595 A1 | 6/1998 | H03L/7/18 |
| EP | 0 926 857 A2 | 6/1999 | H04L/7/02 |
| GB | 2 152715 A | 8/1985 | G06F/7/548 |
| WO | WO 86/06517 | 11/1986 | G06F/1/02 |
| WO | WO 92/02872 | 2/1992 | G06F/1/035 |
| WO | WO 99/23760 | 9/1999 | H04B/1/16 |
| WO | WO 99/49582 | 9/1999 | H04B/1/10 |

OTHER PUBLICATIONS

Aschwanden, Felix, "Direct Conversion—How to make it Work in TV Tuners," IEEE Transactions on Consumer Electronics, US, IEEE Inc. New York, vol. 42, No. 3, Aug. 1, 1996, pp. 729–738, XP000638561.

Hogenauer, Eugene B., Manuscript: "An Economical Class of Digital Filters for Decimation and Interpolation", IEEE Transactions on Acoustics, Speech and Signal Processing, vol. ASSP–29, No. 2, Apr. 1981, 9 pages.

Gardner, F.M., "Interpolation in Digital Modems/Part I: Fundamentals", IEEE Transactions on Communications, IEEE Inc., New York, vol. 41, No. 3, Mar. 1, 1993 (pp. 501–507), XP000372693.

"Digital Tuner with Optimized Clock Frequency and Integrated Parallel CIC Filter and Local Oscillator", Specification, Claims and Abstract (22 pages), 3 pages of drawings, inventor Thad J. Genrich, filed Mar. 17, 2000, U.S. Appln. Ser. No. 09/527,798.

"Parellel Asynchrononous Sample Rate Reducer", Specification, Claims and Abstract (24 pages), 6 pages of drawings, inventor Thad J. Genrich, filed Mar. 17, 2000, U.S. Appln. Ser. No. 09/527,411.

"Apparatus and Method for Quadrature Tuner Error Correction", Specification, Claims and Abstract (32 pages), 3 pages of drawings, inventor Thad J. Genrich, filed Jul. 21, 1999, U.S. Appln. Ser. No. 09/358,354.

PCT International Search Report dated Sep. 28, 2000 for PCT/US00/18334 filed Jul. 3, 2000.

*Primary Examiner*—Tan V. Mai
(74) *Attorney, Agent, or Firm*—Baker Botts L.L.P.

(57) ABSTRACT

A method for generating a trigonometric function is provided that includes an input angle being received and automatically separated into a first component angle and a second component angle. A sine value for the input angle is automatically determined based upon the first and second component angles. A cosine value for the input angle is automatically determined based upon the first and second component angles. The trigonometric function is automatically generated based upon the sine and cosine values for the input angle.

26 Claims, 2 Drawing Sheets

U.S. PATENT DOCUMENTS

| | | | | |
|---|---|---|---|---|
| 4,926,443 A | | 5/1990 | Reich | 375/102 |
| 4,975,699 A | * | 12/1990 | Frey | 708/276 |
| 5,027,087 A | | 6/1991 | Rottinghaus | 332/127 |
| 5,111,162 A | | 5/1992 | Hietala et al. | 332/127 |
| 5,146,418 A | * | 9/1992 | Lind | 708/440 |
| 5,204,676 A | | 4/1993 | Herrmann | 341/61 |
| 5,249,204 A | | 9/1993 | Funderburk et al. | 375/97 |
| 5,276,633 A | | 1/1994 | Fox et al. | 364/721 |
| 5,315,620 A | | 5/1994 | Halawani et al. | 375/102 |
| 5,483,203 A | | 1/1996 | Rottinghaus | 331/10 |
| 5,504,751 A | | 4/1996 | Ledzius et al. | 370/100.01 |
| 5,517,529 A | | 5/1996 | Stehlik | 375/316 |
| 5,596,609 A | | 1/1997 | Genrich et al. | 375/350 |
| 5,697,068 A | | 12/1997 | Salvi et al. | 455/76 |
| 5,790,601 A | | 8/1998 | Corrigan, III et al. | 375/302 |
| 5,812,940 A | | 9/1998 | Lindell | 455/114 |
| 5,815,117 A | | 9/1998 | Kolanek | 342/442 |
| 5,894,592 A | | 4/1999 | Brueske et al. | 455/86 |
| 5,991,605 A | | 11/1999 | Rapeli | 455/76 |
| 6,028,493 A | | 2/2000 | Olgaard et al. | 332/103 |
| 6,055,280 A | | 4/2000 | Genrich | 375/325 |
| 6,133,804 A | | 10/2000 | Wagner et al. | 332/127 |
| 6,298,093 B1 | | 10/2001 | Genrich | 375/271 |

* cited by examiner

METHOD AND SYSTEM FOR GENERATING A TRIGONOMETRIC FUNCTION

TECHNICAL FIELD OF THE INVENTION

This invention relates generally to digital signal processing and more particularly to a method and system for generating a trigonometric function.

BACKGROUND OF THE INVENTION

Determination of the value of sine and cosine of an arbitrary angle is required in a number of Digital Signal Processing (DSP) applications. A frequently occurring application is the Direct Digital Synthesizer (DDS), which generates an output frequency that is proportional to an input frequency control value. The output signal is a multi-bit word that updates at the sample rate to represent a sine-wave at the programmed frequency. Many DDS implementations simultaneously output quadrature (sine and cosine) signals for use in complex tuning applications. A number of implementations also require high resolution phase input and sine/cosine output signal representations to allow processing of signals with a wide dynamic range.

The standard method of determining sine and cosine functions at a high sample rate uses a look-up table (LUT). If the input is a certain number of bits, P, in length, then there are $2^P$ different inputs possible. So an LUT for a P-bit input would require $2^P$ rows, one row for each possible input. If the output is a certain number of bits, S, in length, then the LUT would require a column S bits wide. Therefore, an LUT for a P-bit input and an S-bit output requires $2^P \times S$ bits of memory.

For example, a typical LUT provides P=8 bits of phase input resolution and S=8 bits of sine/cosine output resolution. This LUT would contain $2^8$=256 locations of eight bits each for a total of 2,048 memory bits. However, some applications need a higher resolution LUT, which requires an exponentially higher number of memory bits. For example, doubling the number of the input bits and output bits from 8 to 16 increases the memory requirements from 2,048 bits to 1,048,576 bits. Simultaneous generation of 16-bit sine and cosine output values for a single 16-bit phase input value would require 2,097,152 bits of memory. Thus, small-memory devices, such as field-programmable gate arrays, application-specific integrated circuits, and others, are unable to provide this resolution with look-up tables that require more memory than is available.

SUMMARY OF THE INVENTION

In accordance with the present invention, a method and system for generating a trigonometric function are provided that substantially eliminate or reduce disadvantages and problems associated with previously developed systems and methods. In particular, the present invention, with relatively small memory requirements, generates a high-resolution trigonometric function.

In one embodiment of the present invention, an input angle is received and is automatically separated into a first component angle and a second component angle. A sine value for the input angle is automatically determined based upon the first and second component angles. A cosine value for the input angle is automatically determined based upon the first and second component angles. The trigonometric function is automatically generated based upon the sine and cosine values for the input angle.

More specifically, in accordance with a particular embodiment of the present invention, a sine value for the first component angle is determined by retrieving from a first look-up table of value corresponding to the first component angle. A cosine value for the first component angle is determined by retrieving from a second look-up table a value corresponding to the first component angle. A sine value for the second component angle is calculated based upon a linear approximation. A first intermediate value is generated based upon the sine value for the first component angle and the sine value for the second component angle. A second intermediate value is generated based upon the cosine value for the first component angle and the sine value for the second component angle. The cosine value for the input angle is determined based upon the first intermediate value and the cosine value for the first component angle. The sine value for the input angle is determined based upon the second intermediate value and the sine value for the first component angle.

Technical advantages of the present invention include providing an improved method and system for generating a trigonometric function. In particular, a high-resolution trigonometric function may be generated by separating an input angle into at least two component angles. For at least one of the component angles, a sine value is calculated and a cosine value is set at a constant. As a result, memory requirements are reduced. Accordingly, the improved method and system may be implemented in small memory devices, such as FPGAs, ASICs, and the like, and may also be implemented more efficiently in large memory devices. In addition, the reduced memory requirements provided by the present invention result in a corresponding reduction in the cost of producing a trigonometric function generator.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which.

DETAILED DESCRIPTION OF THE INVENTION

Figure 1:
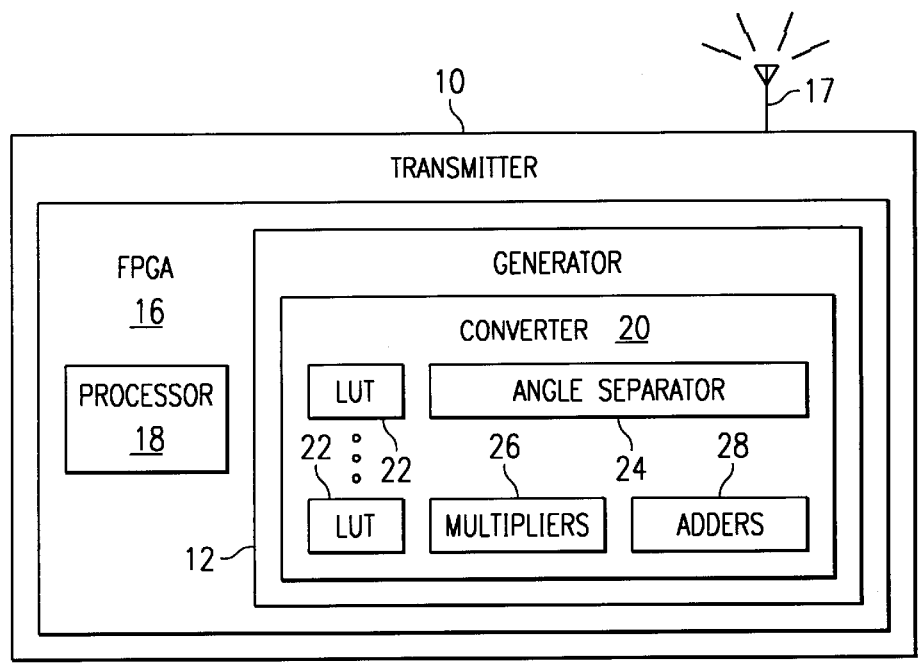
FIG. 1 is a block diagram illustrating a transmitter that utilizes a trigonometric function generator in accordance with one embodiment of the present invention.

FIG. 1 is a block diagram illustrating a transmitter that utilizes a trigonometric function generator 12 in accordance with one embodiment of the present invention. The transmitter 10 comprises a field-programmable gate array (FPGA) 16 and an antenna 17 for transmitting a signal. The transmitter may also comprise other components such as a digital-to-analog converter, a power amplifier, an oscillator, a buffer, a modulator, or other components suitable for transmitting a signal.

The FPGA 16 comprises a processor 18, as well as the generator 12. It should be understood that the generator 12 may be implemented in an application-specific integrated circuit (ASIC) or in software or any other suitable device instead of in an FPGA 16. Furthermore, the generator 12 may be used in a variety of applications other than a transmitter 10, such as a receiver or any other application that performs digital signal processing functions.

The generator 12 comprises a converter 20. It will be understood that the trigonometric function generated by the generator 12 comprises a sine function, a cosine function, or any other suitable function capable of being generated with sine and/or cosine values. The converter 20 converts an input frequency into a proportional output frequency, a phase input into a sine/cosine output, a time domain sample into a frequency domain sample, or other suitable input into a proportional output. The converter 20 also finds utility in any other suitable direct digital synthesizer application, in any application involving fast Fourier transforms, or in any other application that requires the generation of a trigonometric function.

The converter 20 comprises a plurality of look-up tables 22, an angle separator 24, a plurality of multipliers 26, and a plurality of adders 28. Look-up tables 22 store sine and/or cosine values corresponding to specific phases or angles. For example, a look-up table 22 comprises a column of angle values and a column of sine values, with a particular angle value on the same row as its corresponding sine value. Thus, the converter 20 receives an input angle value and accesses a look-up table 22 to determine an output sine value.

In order to reduce the memory requirements for look-up tables 22, an angle separator 24 is utilized to split an input angle into at least two smaller components. Although the angle separator 24 may separate the input angle into more than two component angles, for the embodiments shown in FIGS. 2 and 3, the input angle is separated into only two component angles. For example, the input angle is split into one component including the most significant bits and another component including the least significant bits. In order to minimize the memory requirements for the look-up tables 22, the components should be split as evenly as possible. For example, if the input angle has an even number of bits, the components should be the same size. However, if the input angle has an odd number of bits, one component should include only one bit more than the other component. The sine and cosine values for these component angles are utilized to determine the sine and cosine for the original input angle in accordance with the following trigonometric identities:

$$\cos \phi = \cos(\alpha+\beta) = \cos \alpha \cos \beta - \sin \alpha \sin \beta$$

$$\sin \phi = \sin(\alpha+\beta) = \sin \alpha \cos \beta + \cos \alpha \sin \beta$$

where $\phi$ is the input value, $\alpha$ represents the magnitude of the first component angle, and $\beta$ represents the magnitude of the second component angle.

Memory requirements for look-up tables 22 may also be reduced by exploiting the symmetry of the sine (and/or cosine) function. Between 0 and $2\pi$ radians, the sine function has odd symmetry around $\pi$ radians. This symmetry is efficiently encoded by using the most significant bit (MSB) of the input angle to selectively multiply the look-up table output value by +1 (0 to $\pi$ radians) or −1 ($\pi$ to $2\pi$ radians). If a signed magnitude representation is used for the output signal, the MSB of the input is used as the output sign bit, and no additional logic is required. If a two's complement representation is needed, a selectable two's complementer (invert input bits and add one) is used to multiply the look-up table output value by ±1. The remaining input bits are used to address a look-up table 22 that contains only positive values. This technique allows an additional resolution of one input bit and one sine/cosine output bit to be achieved with no additional look-up table bits.

Between 0 and $\pi$ radians, the sine function is symmetric about $\pi/2$ radians. This symmetry is exploited by using the input bit just below the MSB to selectively invert (using Exclusive OR gates) the remaining least significant bits (LSBs) of the input. The Exclusive OR gate output bits are used as the inputs to the sine/cosine look-up table 22. When the input control bit is 0 (0 to $\pi/2$ radians), a larger LSB input value accesses a higher look-up table address (and a higher sine output value). When the input control bit is 1 ($\pi/2$ to $\pi$ radians), a larger LSB input value accesses a lower look-up table address (and a lower sine output value). This technique allows an additional resolution of one input bit to be achieved with no additional look-up table bits.

Coding of the sine (or cosine) values in the look-up table 22 must be adjusted by an offset value when using this technique to avoid repetition of the maximum possible sine value (A from A sin $\theta$) near $\pi/2$ radians. The look-up table address is all ones when the input bit just below the MSB is zero and the remaining LSBs are all ones. The address is also all ones when the input bit just below the MSB is one and the remaining LSBs are all zeroes. By offsetting the look-up table values by ½ phase input LSB, the value that is repeated is just below peak amplitude, A, and accurately represents the value of A sin $\theta$ for both input codes.

The multipliers 26 and adders 28, as described in more detail below, generate sine and cosine values. The multipliers 26 and adders 28 may be implemented in hardware or software. In accordance with one embodiment of the present invention, the multipliers 26 and adders 28 are used in combination with the data in look-up tables 22. In accordance with another embodiment of the present invention, multipliers 26 and adders 28 are used instead of a look-up table 22 to determine a particular value.

Figure 2:
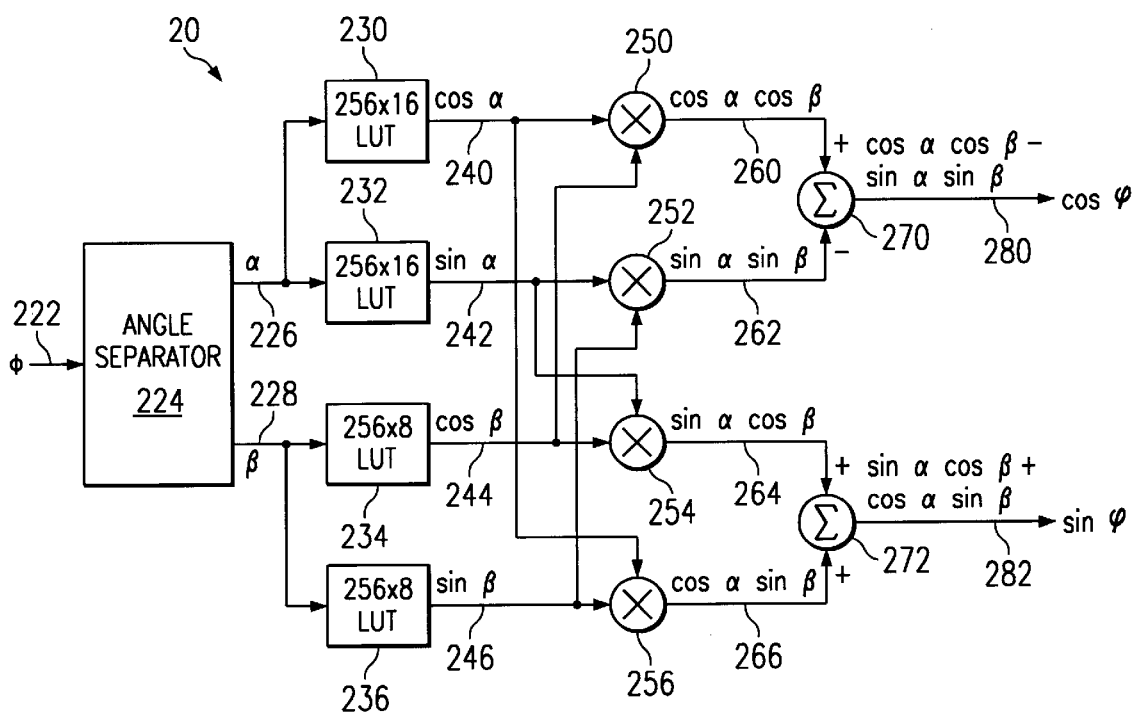
FIG. 2 is a block diagram illustrating a system for the generation of a trigonometric function in accordance with one embodiment of the present invention.

FIG. 2 is a block diagram illustrating a system for the generation of a trigonometric function in accordance with one embodiment of the present invention. It will be understood that the trigonometric function generated by the system comprises a sine function, a cosine function, or any other suitable function capable of being generated with sine and/or cosine values. In this embodiment, the converter 20 receives an input angle, $\phi$ 222, from the processor 18 for conversion to a sine wave for transmission by the transmitter 10 over the antenna 17. In the converter 20, the angle separator 224 receives the input angle, $\phi$ 222, and splits it into a first component angle, $\alpha$ 226, and a second component angle, $\beta$ 228. The first component angle, $\alpha$ 226, is matched to a corresponding cosine value in a cosine $\alpha$ look-up table 230 to generate cosine $\alpha$ 240 and is matched to a corresponding sine value in a sine $\alpha$ look-up table 232 to generate sine $\alpha$ 242.

Similarly, the second component angle, $\beta$ 228, is matched to a corresponding cosine value in a cosine $\beta$ look-up table 234 to generate cosine $\beta$ 244 and is matched to a corresponding sine value in a sine $\beta$ look-up table 236 to generate sine $\beta$ 246.

According to an exemplary embodiment, the input angle, $\phi$ 222, is a 16-bit value. The first component angle represents the eight most significant bits (MSBs) of $\phi$ 222, and the second component angle represents the eight least significant bits (LSBs) of φ 222. Because the input angle is 16 bits, the sine and cosine values stored in look-up tables 230, 232, 234 and 236 vary from 0 to π/2 radians with $2^{16}$ different values. As previously described, symmetry is used to generate the values from π/2 to 2π.

The cosine α look-up table 230 and sine α look-up table 232 store the full 16 bits of output resolution because their input angle values extend over the full 0 to π/2 radian range. The cosine β look-up table 234 and sine β look-up table 236 are assumed to be eight LSBs corresponding to the eight LSBs of the output because their input angle values range only from 0 to π/512 radians. Because these input angle values are so small, the cosine β look-up table 234 will contain values near one (unscaled), and the sine β look-up table 236 will contain values near zero.

The spacing of the values is $(\pi/2)(1/2^{16})$ $2^{-17}\pi$ radians. To achieve symmetry about π/2 radians for independent processing of the two input angle MSBs (not considered here), an offset of ½ input angle LSB, or $2^{-18}\pi$ radians, is required.

Since β 228 represents the value of the eight LSBs, the spacing of the β table values is the same as the overall spacing of $2^{-17}\pi$ radians. The overall angle offset is on the order of the spacing of the β table values, so it is included in the β table computation. The equation for computing the values for the cosine β look-up table 234 is then $$\cos\beta = \text{round}\{A\cos[2^{-18}\pi(2\beta+1)]\}$$

where A is the output amplitude scaling constant. The angular spacing of the values is $2\times2^{-18}\pi$, or $2^{-17}\pi$, radians as required for the overall computation. When β 228 is the minimum value of 0, the output is round $[A\cos(2^{-18}\pi)]$, which has the correct offset of $2^{-18}\pi$ radians. When β 228 is the maximum value of 255, the output is round $[A\cos(2^{-18}\pi\times511)]$. The angle is $2^{-18}\pi$ radians less than $2^{-9}\pi$ radians, which is the range of the sine β look-up table 236. Similarly, the equation for computing the values for the sine β look-up table 236 is then $$\sin\beta = \text{round}\{A\sin[2^{-18}\pi(2\beta+1)]\}.$$

Since α 226 represents the value of the eight MSBs, the spacing of the α table values is $(\pi/2)(1/2^8)=2^{-9}\pi$ radians. The β table values already account for the overall angle offset, so the α table values do not include the offset. Inclusion of the offset in both tables would result in offset doubling, since the effective α 226 and β 228 angles are summed by the computation process. The equations for computing the values for the cosine α look-up table 230 and the sine α look-up table 232 are then $$\cos\alpha = \text{round}[A\cos(2^{-9}\pi\alpha)]$$

$$\sin\alpha = \text{round}[A\sin(2^{-9}\pi\alpha)].$$

By separating the input angle into at least two component angles, the amount of memory required for the look-up tables 22 is greatly reduced. The look-up tables 230, 232, 234 and 236 used for two eight-bit component angles require 12,288 bits of memory, as compared to 2,097,152 bits that would be required for the look-up tables 22 corresponding to an unseparated 16-bit input angle.

The outputs from the look-up tables 230, 232, 234 and 236 are applied to a plurality of multipliers 250, 252, 254 and 256. Specifically, multiplier 250 multiplies cosine α 240 and cosine β 244 to generate a first intermediate value 260, multiplier 252 multiplies sine α 242 and sine β 246 to generate a second intermediate value 262, multiplier 254 multiplies sine α 242 and cosine β 244 to generate a third intermediate value 264, and multiplier 256 multiplies cosine α 240 and sine β 246 to generate a fourth intermediate value 266.

Using an A value of 65535, the intermediate values 260, 262, 264 and 266 are right shifted by 16 bits in order to scale the β 228 values. The shifted intermediate values 260, 262, 264 and 266 are then applied to adders 270 and 272. Specifically, adder 270 subtracts the second intermediate value 262 from the first intermediate value 260 to produce a cosine value 280 for the input angle, φ 222, and adder 272 adds the third intermediate value 264 to the fourth intermediate value 266 to produce a sine value 282 for the input angle, φ 222.

Generator 12 utilizes the cosine and sine values 280 and 282 for the input angle to generate a trigonometric function. According to one embodiment of the present invention, the trigonometric function may be a sine wave that is transmitted over an antenna 17 by a transmitter 10. As described in more detail above, the trigonometric function finds utility in digital signal processing functions, direct digital synthesizer applications, applications involving fast Fourier transforms, or any other applications requiring a trigonometric function.

In accordance with the FIG. 2 embodiment of the present invention, the memory requirements of the generator 12 are reduced. Accordingly, the generator 12 may be implemented in devices with relatively small memories, such as FPGAs 16, ASICs, and other such devices and may be implemented more efficiently in devices with larger memories.

Figure 3:
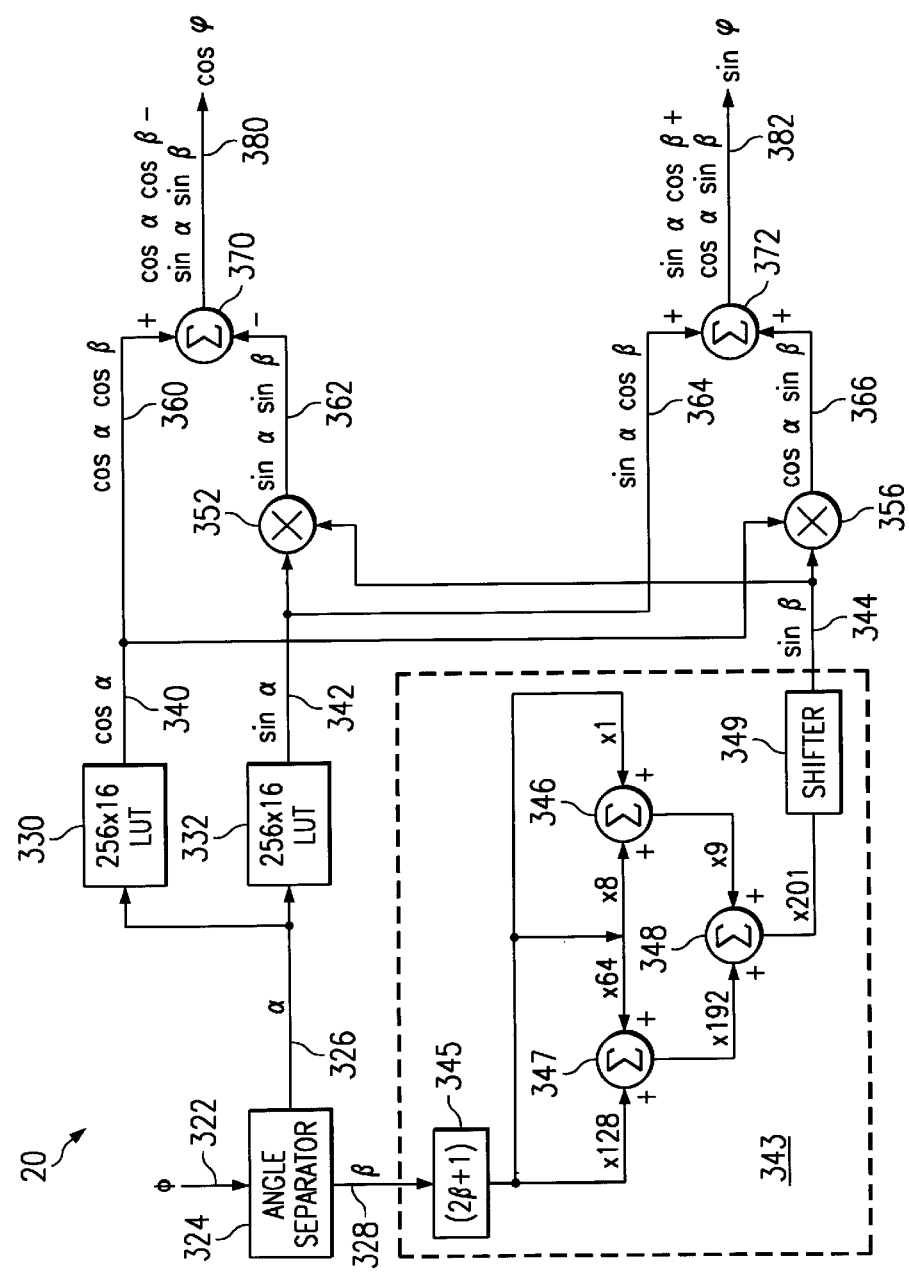
FIG. 3 is a block diagram illustrating a system for the generation of a trigonometric function in accordance with another embodiment of the present invention.

FIG. 3 is a block diagram illustrating a system for the generation of a trigonometric function in accordance with another embodiment of the present invention. It will be understood that the trigonometric function generated by the system comprises a sine function, a cosine function, or any other suitable function capable of being generated with sine and/or cosine values. In this embodiment, the converter 20 receives an input angle, φ 322, from the processor 18 for conversion to a sine wave for transmission by the transmitter 10 over the antenna 17. In the converter 20, the angle separator 324 receives the input angle, φ 322, and splits it into a first component angle, α 326, and a second component angle, β 328. The first component angle, α 326, is matched to a corresponding cosine value in a cosine α look-up table 330 to generate cosine α 340 and is matched to a corresponding sine value in a sine α look-up table 332 to generate sine α 342. As described in more detail below, a cosine β look-up table and a sine β look-up table are not needed for this embodiment. Instead, a cosine β value is generated by a comparator or is set to a constant, and a sine β value is calculated. Thus, the memory requirements for this embodiment are even further reduced than for the embodiment shown in FIG. 2.

As discussed above, the equation for cosine β is $$\cos\beta = \text{round}\{A\cos[2^{-18}\pi(2\beta+1)]\}.$$

The maximum value for cosine β occurs when β=0, and the minimum value occurs when β=255. Since the maximum overall computation result has 16 bits of resolution, an A value of $2^{16}-1$, or 65535, is used. The minimum cosine β value is then $$\cos\beta = \text{round}\{65535\cos[2^{-18}\pi(2*255+1)]\} = 65534.$$

Thus, the cosine β value is either 65535 or 65534, which represents only two states, or one bit of information. Therefore, the value for cosine β may be generated by an eight-bit comparator (not shown in FIG. 3) that detects the input value corresponding to the output value change from 65535 to 65534. This change occurs when $$65534.5=65535 \cos[2^{-18}\pi(2\beta+1)]$$

since the rounding operation returns a value change at a fractional value of 0.5. Solving this equation for β 328 results in $$\beta=162.476.$$

Accordingly, the comparator compares β 328 to the number 162 and generates a value of 65535 for cosine β when β≦162 and a value of 65534 when β>162.

In an alternative embodiment, the cosine β comparator is eliminated by fixing the cosine β value at a constant of 65535. An analysis performed on the generator 12 with the constant cosine value, in comparison with the cosine β comparator, yielded the following results:

|  | cos β = 65535 | comparator |
| --- | --- | --- |
| std(cos_error) | 0.8052 | 0.8114 |
| std(sin_error) | 0.7909 | 0.8116 |

The standard deviations are both better than the cosine β comparator approach. Since the performance is slightly better and less logic is required, fixing the cosine β value at a constant of 65535 appears to be a better approach.

In another embodiment, the cosine β comparator is eliminated by fixing the cosine β value at 65536. This also allows elimination of multipliers for multiplying by the cosine β value because a multiplication by 65536 can be implemented by shifting. An analysis performed on the generator 12 with the constant cosine value of 65536, in comparison with the constant cosine value of 65535, yielded the following results:

|  | cos β = 65536 | cos β = 65535 |
| --- | --- | --- |
| std(cos_error) | 0.7119 | 0.8052 |
| std(sin_error) | 0.7027 | 0.7909 |

The standard deviations are both better for a constant value of 65536 as compared to 65535. However, the analysis with the constant value of 65536 indicated a sine output overflow. In order to take advantage of the better statistics and easier implementation, a negative look-up table offset is used to eliminate the overflow and the single +3 LSB cosine output error while further reducing error offsets.

The full results for a look-up table offset of −0.27 are given below, with comparisons to the best result obtained for a cosine β value of 65535 (which included a look-up table offset of +0.14).

|  | cos β = 65536 (offset = −0.27) | cos β = 65535 (offset = +0.14) |
| --- | --- | --- |
| std(cos_error) | 0.7068 | 0.7888 |
| std(sin_error) | 0.6942 | 0.7713 |

As discussed above, an equation that may be used to calculate the value of sine β 344 is $$\sin \beta = \text{round}\{A \sin[2^{-18}\pi(2\beta+1)]\}.$$

Using an A value of 65535, the maximum sine β 344 value, which occurs when β=255, is $$\sin \beta = \text{round}\ \{65535\ \sin[2^{-18}\Pi(2*255+1)]\}$$

$$= 401.$$

This is a nine-bit unsigned magnitude value, which makes implementation of sine β multipliers 352 and 356 significantly more complex than for an eight-bit value. Therefore, according to one embodiment, the calculated sine β values are scaled by ½ to limit them to eight-bit magnitudes. The outputs of the sine β multipliers 352 and 356 are then right shifted by 15 bits, instead of the 16-bit shift used without scaled values, to compensate for the change. In accordance with this embodiment, the equation for calculating the sine β 344 values is $$\sin \beta = \text{round}\{65535 \sin[2^{-18}\pi(2\beta+1)]/2\}.$$

The maximum sine β 344 value for this embodiment is $$\sin \beta = \text{round}\{65535 \sin[2^{-18}\pi(2*255+1)]/2\}=201.$$

The sine function is known to be linear near 0, and the range of sine β 344 is 0 to π/512 radians. Therefore, a linear approximation technique is used to calculate the sine β 344 values. The ratio of the output value of sine β344 to the input value, 2β+1, when β=255 is $$k=200.6649145295/511=0.3926906350871.$$

A nine-bit approximation of this fraction is given by $$K=\text{round}(512k)/512$$

$$K=\text{round}(201.0576051646)/512=201/512.$$

A nine-bit representation is used instead of eight bits due to the reduced error of the resulting constant. The error of this constant is −0.0576051646/201.0576051646=−2.865107×10⁻⁴. Expressed in bits, the error is $\log_2(2.865107 \times 10^{-4})=-11.769$ bits from the peak value. The peak value is $\log_2(201.0576051646)=+7.651$ bits relative to 1 (LSB), so the error is 7.651−11.769=−4.118, or approximately four bits below the LSB.

According to one embodiment of the present invention, a sine β device 343 is implemented to produce a sine β 344 value using the linear approximation just described. The sine β device 343 comprises a full multiplier that multiplies the input value by 201/512. In order to reduce logic requirements, however, an alternative to a full multiplier may be used. Because 201 is the sum of 128, 64, 8 and 1, a multiplier which produces the product of 201 and a variable input is constructed with three adders 346, 347 and 348, as shown in FIG. 3.

In accordance with the previously derived equation, the sine β device 343 uses a calculation value 345 of 2β+1. This calculation value 345 may be generated by the sine β device 343, the converter 20, or any other suitable element and may be generated with multipliers, adders, or other appropriate software or hardware. The calculation value 345 is left shifted by three bits, six bits, and seven bits. The calculation value 345 and the three-bit shifted value are added by adder 346, and the six-bit shifted value and the seven-bit shifted value are added by adder 347. The outputs from adders 346 and 347 are then added by adder 348 to produce an output that is 201 times the original calculation value 345. It will be understood that the inputs to the adders may be arranged differently without departing from the scope of this invention. For example, the calculation value 345 and the seven-bit shifted value may be added by adder 346, while the three-bit shifted value and the six-bit shifted value are added by adder 347, as well as other combinations. The division by 512 is then implemented by a shifter 349 that right shifts the output from adder 348 by nine bits.

As previously described, according to one embodiment, the cosine α look-up table 330 generates cosine α 340, the sine α look-up table 332 generates sine α 342 cosine β is set at a constant value of 65536, and the sine β device 343 generates sine β 344. Using this embodiment, multiplying a value by cosine β and then right shifting the result by 16 bits yields the original value. This is because multiplying any value by 65536 (the value of cosine β is equivalent to left shifting by 16 bits, which is canceled out by the following 16-bit shift to the right. Accordingly, multiplication and shifting are unnecessary for these values in this embodiment.

Therefore, as shown in FIG. 3, cosine α 340 is equivalent to a first intermediate value 360 of (cosine α)·(cosine β), right shifted by 16 bits. Multiplier 352 multiplies sine α 342 and sine β 344 to produce a second intermediate value 362. Sine α 342 is equivalent to a third intermediate value 364 of (sine α)·(cosine β), right shifted by 16 bits. Multiplier 356 multiplies cosine α 340 and sine β 344 to produce a fourth intermediate value 366.

Adder 370 subtracts the second intermediate value 362 from the first intermediate value 360 to produce a cosine value 380 for the input angle, φ 322. Adder 372 adds the third intermediate value 364 to the fourth intermediate value 366 to produce a sine value 382 for the input angle, φ 322.

Generator 12 utilizes the cosine and sine values 380 and 382 for the input angle that are produced by adders 370 and 372 to generate a trigonometric function. According to one embodiment of the present invention, the trigonometric function may be a sine wave that is transmitted over an antenna 17 by a transmitter 10. As described in more detail above, the trigonometric function may be used in digital signal processing functions, direct digital synthesizer applications, applications involving fast Fourier transforms, or any other applications requiring a trigonometric function.

In accordance with this embodiment of the present invention, a trigonometric function is generated with memory requirements reduced even further than those of the embodiment of FIG. 2. Accordingly, this invention may be implemented in devices with relatively small memories, such as FPGAs 16, ASICs, and other such devices and may be implemented more efficiently in devices with larger memories.

Figure 4:
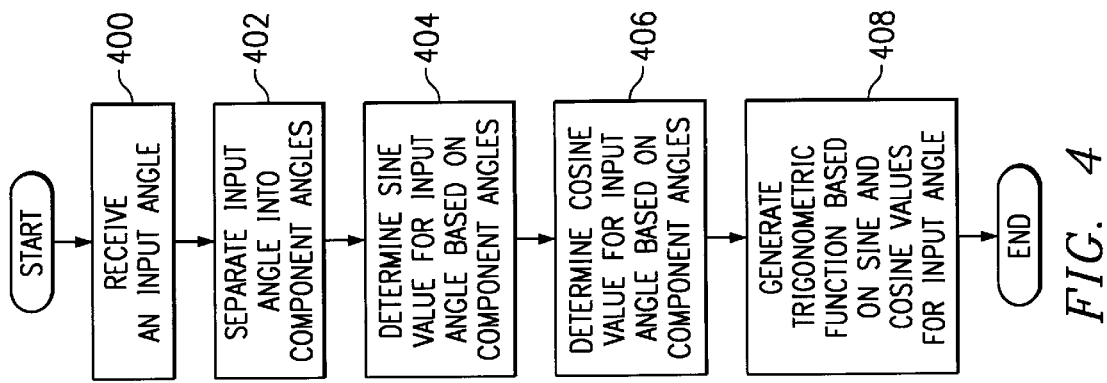
FIG. 4 is a flowchart illustrating a method for generating a trigonometric function in accordance with one embodiment of the present invention.

FIG. 4 is a flow chart illustrating a method for generating a trigonometric function in accordance with one embodiment of the present invention. It will be understood that the trigonometric function generated by the method comprises a sine function, a cosine function, or any other suitable function capable of being generated with sine and/or cosine values. The method begins at step 400 where an input angle is received. In step 402, the input angle is automatically separated into component angles. According to one embodiment, as previously described, the input angle is separated into two component angles, with the first component angle comprising the most significant bits of the input angle and the second component angle comprising the least significant bits of the input angle.

At step 404, a sine value for the input angle is automatically determined based upon the component angles. At step 406, a cosine value for the input angle is automatically determined based upon the component angles. In accordance with one embodiment of the present invention, the sine value and cosine value determined in steps 404 and 406 are based on previously determined sine values and cosine values for the component angles. The sine and cosine values for the component angles may be determined by accessing data in a look-up table or by calculating linear approximations or may be set to a constant value. At step 408, a trigonometric function is automatically generated based on the sine and cosine values for the input angle, as determined in steps 404 and 406.

Although the present invention has been described with several embodiments, various changes and modifications may be suggested to one skilled in the art. It is intended that the present invention encompass such changes and modifications as fall within the scope of the appended claims.

What is claimed is:

1. A method for determining a trigonometric value for an angle, comprising:

receiving an input angle;

separating the input angle into a first component angle and a second component angle at an angle separator;

establishing one or more trigonometric values of a set of trigonometric values associated with the first component angle and the second component angle, at least one trigonometric value established according to a procedure selected from a group consisting of:

comparing the second component angle to a predetermined threshold to determine the at least one trigonometric value; and determine the at least one trigonometric value at a sine beta device;

generating one or more intermediate values of a set of intermediate values at one or more multipliers in accordance with the one or more trigonometric values; and determining an output trigonometric value of a set of output trigonometric values at one or more adders in accordance with the one or more intermediate values.

2. The method of claim 1, further comprising setting a trigonometric value of the one or more trigonometric values to a constant selected from a group consisting of a maximum cosine value and a minimum cosine value.

3. The method of claim 1, wherein comparing the second component angle to a predetermined threshold to determine the at least one trigonometric value comprises:

comparing the second component angle to the predetermined threshold;

determining that a cosine value of the second component angle comprises a first cosine value if the second component angle is less than the predetermined threshold; and determining that the cosine value for the second component angle comprises a second cosine value if the second component angle is greater than the predetermined threshold.

4. The method of claim 1, wherein determining the at least one trigonometric value at a sine beta device comprises:

establishing a ratio of a maximum sine value to an angle corresponding to the maximum sine value; and multiplying the second component angle by the ratio to generate a sine value of the second component angle.

5. The method of claim 1, wherein establishing the one or more trigonometric values comprises:
retrieving a trigonometric value of the one or more trigonometric values from a lookup table, the retrieved trigonometric value corresponding to an angle within a range of zero to two divided by pi; and
calculating a new trigonometric value in accordance to the retrieved trigonometric value, the new trigonometric value corresponding to an angle within a range of two divided by pi to two pi.

6. The method of claim 1, further comprising:
generating a trigonometric waveform signal in accordance to the determined output trigonometric value; and
transmitting the trigonometric waveform signal using a transmitter.

7. The method of claim 1, wherein:
the first component angle corresponds to one or more most significant bits; and
the second component angle corresponds to one or more least significant bits.

8. The method of claim 1, wherein a number of bits corresponding to the first component angle is approximately equal to a number of bits corresponding to the second component angle.

9. The method of claim 1, wherein the set of trigonometric values consists of:
a first cosine value of the first component angle;
a second cosine value of the second component angle;
a first sine value of the first component angle; and
a second sine value of the second component angle.

10. The method of claim 1, wherein the set of intermediate values consists of:
a first intermediate value generated by multiplying a first cosine value of the first component angle with a second cosine value of the second component angle;
a second intermediate value generated by multiplying a first sine value of the first component angle with a second sine value of the second component angle;
a third intermediate value generated by multiplying the first sine value with the second cosine value; and
a fourth intermediate value generated by multiplying the first cosine value with the second sine value.

11. The method of claim 1, wherein the set of output trigonometric values consists of:
a cosine value of the input angle determined by subtracting a second intermediate value from a first intermediate value, the first intermediate value generated by multiplying a first cosine value of the first component angle with a second cosine value of the second component angle, the second intermediate value generated by multiplying a first sine value of the first component angle with a second sine value of the second component angle; and
a sine value of the input angle determined by adding a third intermediate value and a fourth intermediate value, the third intermediate value generated by multiplying the first sine value with the second cosine value, and the fourth intermediate value generated by multiplying the first cosine value with the second sine value.

12. A system for determining a trigonometric value for an angle, comprising:
an angle separator operable to separate an input angle into a first component angle and a second component angle;
a generator component coupled to the angle separator and operable to establish one or more trigonometric values of a set of trigonometric values associated with the first component angle and the second component angle, the generator component comprising a component selected from a group consisting of:
a comparator operable to compare the second component angle to a predetermined threshold to determine the at least one trigonometric value; and
a sine beta device operable to determine the at least one trigonometric value;
one or more multipliers coupled to the generator component and operable to generate one or more intermediate values of a set of intermediate values in accordance with the one or more trigonometric values; and
one or more adders coupled to the one or more multipliers and operable to determine an output trigonometric value of a set of output trigonometric values in accordance with the one or more intermediate values.

13. The system of claim 12, wherein the generator component is operable to set a trigonometric value of the one or more trigonometric values to a constant selected from a group consisting of a maximum cosine value and a minimum cosine value.

14. The system of claim 12, wherein the comparator is operable to compare the second component angle to a predetermined threshold to determine the at least one trigonometric value by:
comparing the second component angle to the predetermined threshold;
determining that a cosine value of the second component angle comprises a first cosine value if the second component angle is less than the predetermined threshold; and
determining that the cosine value for the second component angle comprises a second cosine value if the second component angle is greater than the predetermined threshold.

15. The system of claim 12, wherein the sine beta device is operable to determine the at least one trigonometric value by:
establishing a ratio of a maximum sine value to an angle corresponding to the maximum sine value; and
multiplying the second component angle by the ratio to generate a sine value of the second component angle.

16. The system of claim 12, wherein the generator component is operable to establish the one or more trigonometric values by:
retrieving a trigonometric value of the one or more trigonometric values from a lookup table, the retrieved trigonometric value corresponding to an angle within a range of zero to two divided by pi; and
calculating a new trigonometric value in accordance to the retrieved trigonometric value, the new trigonometric value corresponding to an angle within a range of two divided by pi to two pi.

17. The system of claim 12, further comprising:
a processor operable to generate a trigonometric waveform signal in accordance to the determined output trigonometric value; and
a transmitter coupled to the processor operable to transmit the trigonometric waveform signal.

18. The system of claim 12, wherein:
the first component angle corresponds to one or more most significant bits; and the second component angle corresponds to one or more least significant bits.

19. The system of claim 12, wherein a number of bits corresponding to the first component angle is approximately equal to a number of bits corresponding to the second component angle.

20. The system of claim 12, wherein the set of trigonometric values consists of:
   a first cosine value of the first component angle;
   a second cosine value of the second component angle;
   a first sine value of the first component angle; and
   a second sine value of the second component angle.

21. The system of claim 12, wherein the set of intermediate values consists of:
   a first intermediate value generated by multiplying a first cosine value of the first component angle with a second cosine value of the second component angle;
   a second intermediate value generated by multiplying a first sine value of the first component angle with a second sine value of the second component angle;
   a third intermediate value generated by multiplying the first sine value with the second cosine value; and
   a fourth intermediate value generated by multiplying the first cosine value with the second sine value.

22. The system of claim 12, wherein the set of output trigonometric values consists of:
   a cosine value of the input angle determined by subtracting a second intermediate value from a first intermediate value, the first intermediate value generated by multiplying a first cosine value of the first component angle with a second cosine value of the second component angle, the second intermediate value generated by multiplying a first sine value of the first component angle with a second sine value of the second component angle; and
   a sine value of the input angle determined by adding a third intermediate value and a fourth intermediate value, the third intermediate value generated by multiplying the first sine value with the second cosine value, and the fourth intermediate value generated by multiplying the first cosine value with the second sine value.

23. A system for determining a trigonometric value for an angle, comprising:
   means for receiving an input angle;
   means for separating the input angle into a first component angle and a second component angle;
   means for establishing one or more trigonometric values of a set of trigonometric values associated with the first component angle and the second component angle, at least one trigonometric value established according to a procedure selected from a group consisting of:
      comparing the second component angle to a predetermined threshold to determine the at least one trigonometric value; and
      determining the at least one trigonometric value at a sine beta device;
   means for generating one or more intermediate values of a set of intermediate values in accordance with the one or more trigonometric values; and
   means for determining an output trigonometric value of a set of output trigonometric values in accordance with the one or more intermediate values.

24. A method for determining a trigonometric value for an angle, comprising:
   receiving an input angle;
   separating the input angle into a first component angle and a second component angle at an angle separator, the first component angle corresponding to one or more most significant bits, the second component angle corresponding to one or more least significant bits, a number of bits corresponding to the first component angle being approximately equal to a number of bits corresponding to the second component angle;
   establishing one or more trigonometric values of a set of trigonometric values associated with the first component angle and the second component angle, the set of trigonometric values consisting of a first cosine value of the first component angle, a second cosine value of the second component angle, a first sine value of the first component angle, and a second sine value of the second component angle, at least one trigonometric value established according to a procedure selected from a group consisting of:
      comparing the second component angle to a predetermined threshold to determine the at least one trigonometric value by comparing the second component angle to the predetermined threshold, by determining that a cosine value of the second component angle comprises a greater cosine value if the second component angle is less than the predetermined threshold, and by determining that the cosine value for the second component angle comprises a lesser cosine value if the second component angle is greater than the predetermined threshold; and
      determining the at least one trigonometric value at a sine beta device by establishing a ratio of a maximum sine value of the second component angle to an angle corresponding to the maximum sine value of the second component angle, and by multiplying the second component angle by the ratio to generate a sine value of the second component angle;
   setting a first trigonometric value of the one or more trigonometric values to a constant selected from a group consisting of a maximum cosine value and a minimum cosine value;
   retrieving a second trigonometric value of the one or more trigonometric values from a lookup table, the retrieved trigonometric value corresponding to an angle within a range of zero to two divided by pi, and calculating a new trigonometric value in accordance to the retrieved trigonometric value, the new trigonometric value corresponding to an angle within a range of two divided by pi to two pi;
   generating one or more intermediate values of a set of intermediate values at one or more multipliers in accordance with the one or more trigonometric values, the set of intermediate values consisting of a first intermediate value generated by multiplying the first cosine value with the second cosine value, a second intermediate value generated by multiplying the first sine value with the second sine value, a third intermediate value generated by multiplying the first sine value with the second cosine value, and a fourth intermediate value generated by multiplying the first cosine value with the second sine value;
   determining an output trigonometric value of a set of output trigonometric values at one or more adders in accordance with the one or more intermediate values, the set of output trigonometric values consisting of a cosine value of the input angle determined by subtracting the second intermediate value from the first intermediate value, and a sine value of the input angle determined by adding the third intermediate value and the fourth intermediate value;

generating a trigonometric waveform signal in accordance to the determined output trigonometric value; and transmitting the trigonometric waveform signal using a transmitter.

25. A system for generating a trigonometric function, comprising:

an angle separator for separating the input angle into a first component angle and a second component angle;

a look-up table storing sine values corresponding to the first component angle and cosine values corresponding to the first component angle;

a sine-beta device for determining a sine value for the second component angle independent of a look-up table;

a multiplier for multiplying a sine value for the first component angle and a sine value for the second component angle to produce a first multiplier output and to multiply a cosine value for the first component angle and the sine value for the second component angle to produce a second multiplier output;

an adder to subtract the first multiplier output from the cosine value for the first component angle to produce a cosine value for the input angle and to add the second multiplier output and the sine value for the first component angle to produce a sine value for the input angle; and a function generator for generating the trigonometric function based upon the sine value for the input angle and the cosine value for the input angle.

26. The system of claim 25, wherein the sine-beta device comprises a plurality of adders and a plurality of shifters.

* * * * *

UNITED STATES PATENT AND TRADEMARK OFFICE
CERTIFICATE OF CORRECTION

PATENT NO. : 6,640,237 B1
DATED : October 28, 2003
INVENTOR(S) : Thad J. Genrich It is certified that error appears in the above-identified patent and that said Letters Patent is hereby corrected as shown below:

Column 2,
Line 60, between "transmitter" and "that", insert -- 10 --.

Column 5,
Line 17, "$(\pi/2)(1/2^{16})\ 2^{-17}\pi$ radians." should be -- $(\pi/2)(1/2^{16}) = 2^{-17}\pi$ radians. --
Lines 36-37, "[A cos ($2^{-18}\ \pi$ x 5111)]" should be -- [A cos ($2^{-18}\ \pi$ x 5111)] --; and
Line 37, "$2^{-19}\pi$" should be -- $2^{-9}\pi$ --.

Column 9,
Line 20, "(the value of cosine β is equivalent" should be -- (the value of cosine β) is equivalent --.

Column 10,
Line 36, "determine the at least" should be -- determining the at least --.

Signed and Sealed this

Tenth Day of August, 2004

JON W. DUDAS
*Acting Director of the United States Patent and Trademark Office*